(12) United States Patent
Swanson et al.

(10) Patent No.: US 9,436,369 B2
(45) Date of Patent: Sep. 6, 2016

(54) TOUCH INTERFACE FOR PRECISE ROTATION OF AN OBJECT

(71) Applicant: Disney Enterprises, Inc., Burbank, CA (US)

(72) Inventors: Alexander P. Swanson, Eugene, OR (US); Christopher R. Cervantes, Las Vegas, NV (US); Jason E. Hetu, Creswell, OR (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/497,480

(22) Filed: Sep. 26, 2014

(65) Prior Publication Data

US 2016/0092080 A1    Mar. 31, 2016

(51) Int. Cl.
*G06F 3/0484* (2013.01)
*G06F 3/0488* (2013.01)

(52) U.S. Cl.
CPC ......... *G06F 3/04845* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| | | | |
|---|---|---|---|
| 2012/0026196 A1* | 2/2012 | Deng | G06F 3/033 345/156 |
| 2012/0162103 A1* | 6/2012 | Kobayashi | G06F 3/04815 345/173 |
| 2014/0009415 A1* | 1/2014 | Nishida | G06F 3/04886 345/173 |
| 2015/0054753 A1* | 2/2015 | Morgan | A61B 17/072 345/173 |
| 2015/0145891 A1* | 5/2015 | Kuffner | G06T 3/60 345/649 |

* cited by examiner

*Primary Examiner* — Chante Harrison
(74) *Attorney, Agent, or Firm* — Patterson + Sheridan LLP

(57) ABSTRACT

Systems, methods, and computer program products to rotate virtual objects within a virtual environment being displayed on a touch screen display, by, upon receiving a selection of a first virtual object using the touch screen display, rendering one or more frames depicting a rotation tool in a predefined location relative to the first virtual object and having a first orientation to the first virtual object, responsive to receiving input from the touch screen display, moving the rotation tool from a first location to a second location on the touch screen display as specified by the received input, and responsive to the movement of the rotation tool, rotating the first virtual object within the virtual environment based on the movement of the rotation tool, wherein the first virtual object substantially maintains the first orientation to the rotation tool throughout the movement.

18 Claims, 9 Drawing Sheets

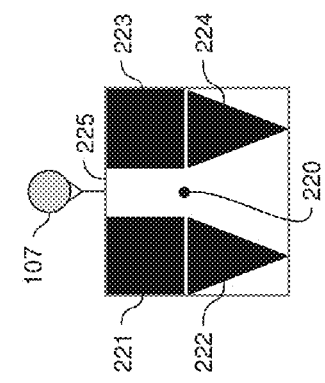
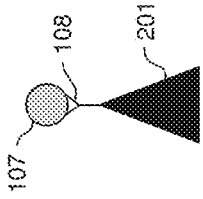
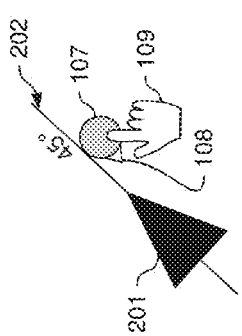
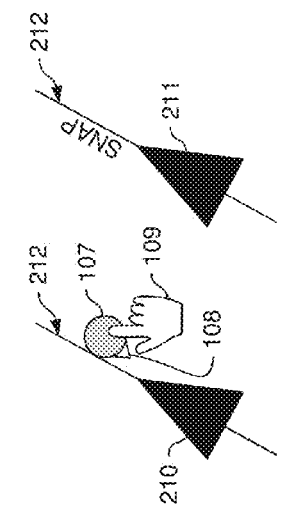
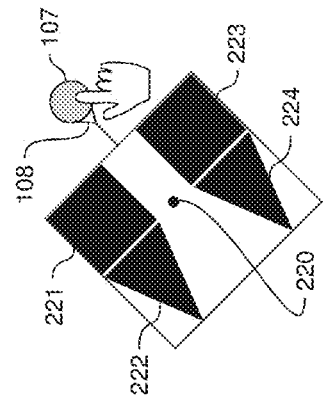
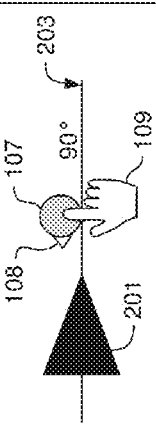

TOUCH INTERFACE FOR PRECISE ROTATION OF AN OBJECT

BACKGROUND

1. Field of the Disclosure

Embodiments disclosed herein relate to user interfaces. More specifically, embodiments disclosed herein relate to computer software to provide a touch interface for precise rotation of an object.

2. Description of the Related Art

Modern computer programs allow users to customize the positions of objects in a virtual environment using a touch-based interface. Working with three-dimensional (3D) objects creates the possibility to rotate objects to face any direction in the virtual environment. However, most touch interfaces limit object orientation rotation to 90 degree changes. Generally, there is no standard, easy to use touch interface that has been developed for these purposes. For example, users have been limited to clicking buttons to incrementally rotate objects in one direction. Furthermore, users have traditionally been unable to access traditional camera controls that allow players to pan and zoom in the virtual environment while rotating selected objects using a touch interface.

SUMMARY

Embodiments disclosed herein provide systems, methods, and computer program products to rotate virtual objects within a virtual environment being displayed on a touch screen display, by, upon receiving a selection of a first virtual object using the touch screen display, rendering one or more frames depicting a rotation tool in a predefined location relative to the first virtual object and having a first orientation to the first virtual object, responsive to receiving input from the touch screen display, moving the rotation tool from a first location to a second location on the touch screen display as specified by the received input, and responsive to the movement of the rotation tool, rotating the first virtual object within the virtual environment based on the movement of the rotation tool, wherein the first virtual object substantially maintains the first orientation to the rotation tool throughout the movement.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIGS. 2A-2G are schematics illustrating a touch interface for precise rotation of an object, according to one embodiment.

DETAILED DESCRIPTION

Figure 1A:
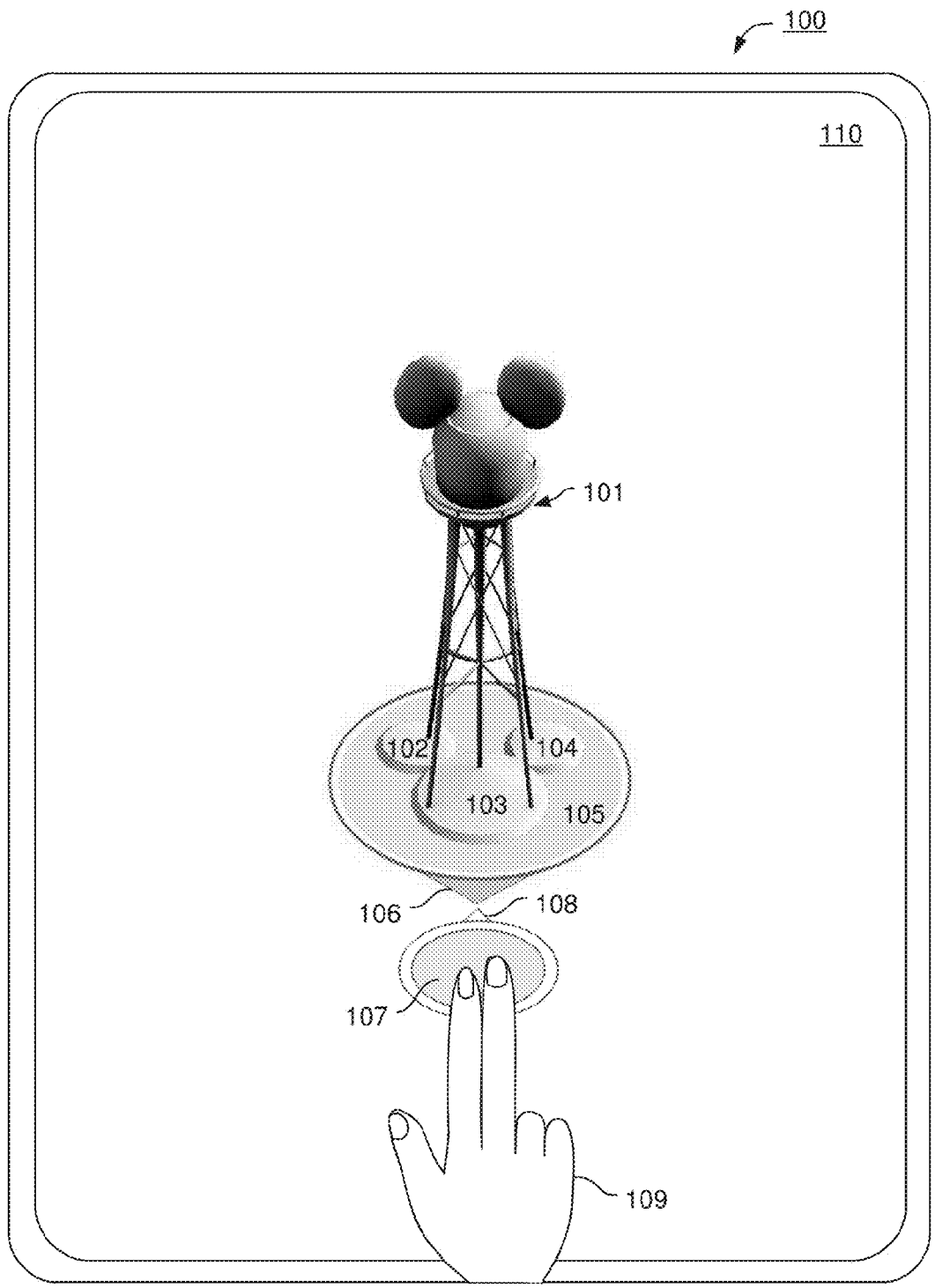
FIGS. 1A-1D are schematics illustrating a touch interface for precise rotation of an object, according to one embodiment.

Embodiments disclosed herein allow freeform object movement and rotation while maintaining camera pan and zoom controls in a computer program displaying the objects. More specifically, embodiments disclosed herein provide a rotation tool (or widget) that appears adjacent to an object in a three dimensional (3D) or isometric computer program (such as a video game or other virtual environment) that allows the player to change the object's orientation (i.e., facing or rotation) with a high degree of accuracy. The object being rotated may be two dimensional or three dimensional. The rotation tool appears co-planar with whichever plane is perpendicular to the axis around which the object will be rotated (e.g., the ground plane within the virtual world). When the player drags the rotation tool (e.g., using a finger on a touch-sensitive input device), the object's facing changes in real time such that the "front" of the object points directly towards the rotation tool. The rotation tool itself follows the user's finger (or other object used to provide touch input) as the user moves the rotation tool across the touch surface. When the player releases the rotation tool, the object keeps its new facing.

The rotation of the object can be a uniform over a full 360 degrees of rotation. Additionally, the rotation of the object can be locked to specific intervals (such as 5 degrees, 15 degrees, 30 degrees, etc), in which case the object's facing will snap to the interval that brings the object closest to facing the widget's current position. For example, if the intervals are predefined to be 10 degree intervals, and the angle of rotation (relative to a center point of the object) is a total of 41 degrees, the object may rotate four times (at 10, 20, 30, and 40 degrees), while finally locking in at 40 degrees, which is closest to the 41 degrees of rotation the widget experienced relative to the center point of the object. Providing interval-based rotation may make it easier for the user to match the orientation of multiple objects to one another while still allowing a high level of customization. Of course, it is contemplated that the intervals may be predefined to be any desired value. In addition, the intervals may be user-selectable to provide the user with additional control over manipulation of the object.

Additionally, embodiments disclosed herein may recognize when users rotate similar objects near one another, and attempt to "snap" the rotation of a selected object to match the other similar objects. The snap range at which the objects would be able to snap may be customized based on different user or game parameters. The snapping interface may appear as two parallel lines running through the axis of each object. When "snapping," the selected object's rotation would stay snapped to match the target object, while the rotation tool would follow the user's finger. Once the rotation tool moves past the snap range, the rotation of the selected object would continue to follow the rotation tool. A snapping interface may similarly be used when moving the object.

Still further, embodiments disclosed herein provide for the simultaneous rotation of multiple objects. If a user selects multiple objects (for example, by touching each object in sequence), a guide shape (such as a box, or a circle) may be displayed around all selected objects, with the rotation tool appearing along the axis of the guide shape. When the rotation tool is dragged, all objects rotate together as a group, while maintaining the same relative positions and rotational values to one another. When a user drags any of the selected objects, all objects would move together.

Furthermore, embodiments disclosed herein maintain camera pan and zoom controls while users rotate or move objects. The "camera" may generally provide a view of a virtual environment the user is interacting with, such as one city block, of multiple city blocks, displayed in a game that allows users to build cities. Generally, when a player drags an area of the virtual environment that is outside of an object, the camera view would be moved to match the user's drag, also referred to as screen scrolling. Pinch and twist controls would similarly zoom and rotate the camera view of the virtual environment the user is interacting with.

Therefore, embodiments disclosed herein simulate moving and rotating an object from an overhead view (e.g., within a builder game), much like picking up and rotating a book on the surface of a table. The viewpoint is manipulated through established controls typical to a touch platform (e.g., finger/stylus gestures such as pinch to zoom, drag to pan), while the rotation tool provides precise manipulation of an object (or objects) visible from within that view.

FIG. 1A is a schematic illustrating touch screen device 100 providing a touch interface for precise rotation of an object, according to one embodiment. The touch screen device 100 includes a touch screen display 110. The touch screen device 100 may be any device capable of receiving input through a touch screen, such as a laptop, touch-enabled monitor, tablet computer, smart phone, portable gaming system, and the like. As shown, the display 110 of the touch screen device 100 generates an output that includes a water tower object 101. Generally, any number and type of objects 101 may be displayed on the touch screen 110. The object 101 may be part of a game or other computer program which allows users to manipulate objects on a virtual canvas or environment. As shown, three circles 102-104 are included at the base of the water tower 101. The circles 102-104 may be considered to be part of the water tower 101. Generally, the circles 102-104 are shown to more clearly depict rotation of the object 101 in FIGS. 1A-1D. Furthermore, the circles 102-104 need not be circles, but may be any shape or object.

As shown, the touch screen 110 also depicts a rotation tool 107. The rotation tool 107 is a selectable object that may be used to control the orientation of selected objects displayed on the touch screen display 110, such as the water tower 101. The rotation tool 107 may take any shape or size, as the particular rotation tool 107 is for illustrative purposes, and should not be considered limiting of the disclosure. Generally, the rotation tool 107 may be rendered on the display 110 when a user selects an object, such as the water tower 101 (which includes the associated circles 102-104). The rotation tool 107 may take any shape or format, as the elliptical shape depicted is for illustrative purposes only. When the user selects the water tower 101, the rotation tool 107 appears, and a rotation bubble 105 is drawn on a plane perpendicular to the axis of rotation of the water tower 101. In at least one embodiment, the axis of rotation may be a predefined axis of rotation, such as the z-axis. In other embodiments, the axis of rotation may be selected by a user. Furthermore, the rotation bubble 105 and the rotation tool 107 include pointing indicators 106 and 108, respectively. The pointing indicators 106 and 108 are configured to always face each other during movement of the rotation tool 107. Therefore, as shown, the pointing indicator 106 of the rotation bubble 105 is pointing in a downwards direction in the display 110, while the pointing indicator 108 of the rotation tool 107 is pointing in an upwards direction. Although shown as triangles, the pointing indicators 106 and 108 may take any form, such as an arrow, line, or the like. In at least one embodiment, the pointing indicators 106 and 108 touch when the rotation tool 107 is initially displayed (and prior to any movement by the user). The pointing indicator 106 of the rotation bubble 105 may correspond to a "front" face of the object that is locked to the rotation tool 107. The "front" face of the object remains locked to the rotation tool 107, such that the object follows the rotation tool 107 in real time as the rotation tool 107 moves around the display.

When the user drags the rotation tool 107 to a new area on the screen 110, the selected object rotates to follow (or mimic) the movement of the rotation tool, such that the pointing indicators always substantially face each other. The hand 109 depicts a user's finger, stylus, pen, or other input device that is used to select the rotation tool 107 (or other objects on the touch display 110), and move the rotation tool 107 to different places on the touch display 110.

Figure 1B:
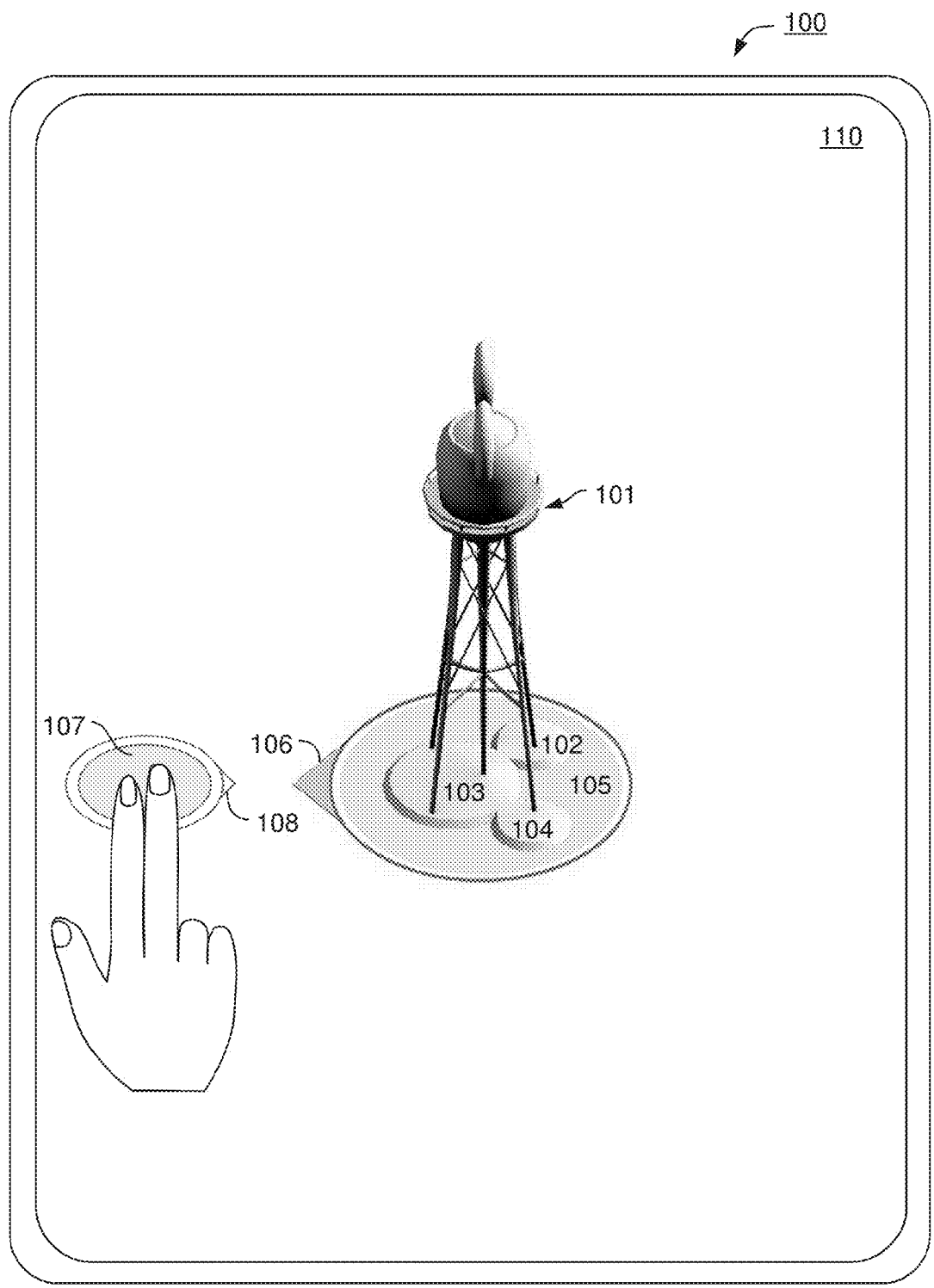

FIG. 1B illustrates the touch screen device 100 as the user has moved the rotation tool 107 to a new position on the display 110. As shown, the user has moved the rotation tool 107 such that it is approximately due west of the water tower 101. Stated differently, the user has moved the rotation tool 107 90 degrees counter-clockwise (or 270 degrees clockwise) from the position in FIG. 1A relative to the water tower 101 (or a center point thereof). As the user moves the rotation tool 107, the water tower 101 (and circles 102-104) rotates such that the pointing indicator 106 of the rotation bubble 105 points at the pointing indicator 108 of the rotation tool 107. As such, the pointing indicator 106 of the rotation bubble 105 is pointing due west, while the pointing indicator 108 of the rotation tool 107 is pointing due east. In at least one embodiment, the selected object rotates in fluid motion while following the movement of the rotation tool 107. For example, if the water tower 101 is a 3D object, the rotation of the water tower 101 may precisely follow the movement of the rotation tool 107.

However, in other embodiments, the rotation of selected objects may be restricted to predefined intervals of rotation. For example, predefined intervals of rotation may be defined, such as 5, 10, or 15 degree intervals. In such embodiments, the selected object only moves once the rotation tool 107 has moved a threshold distance (such as 5, 10, or 15 degrees, relative to the center point of the selected object). Therefore, if 5 degree intervals are defined, and the user moves the rotation tool 107 20 degrees clockwise, the selected object will rotate four times, namely when the rotation tool 107 reaches 5, 10, 15, and 20 degrees of movement relative to the selected object.

In still another embodiment, some objects may not be depicted as full three-dimensional graphical objects. In such a case, 360 degrees of rotation are not possible, as only a limited number of frames (or images) of the object are available to depict the graphical object from different perspectives. In such a scenario, embodiments disclosed herein would divide the touch display 110 into a number of zones according to the number of available frames for the object. Each zone may correspond to a frame of the object. The object may be rotated and displayed based on the zone the rotation tool 107 is currently in. For example, there may only be 4 frames for the water tower 101, based on a north, south, east, and west vantage point of the water tower 101. In such a case, the display 110 may be divided into four equally zones, namely a north, south, east, and west zone. The zones may align to traditional quadrants (i.e., 0 to 90 degrees, 90 to 180 degrees, etc), or may be offset. For example, the zones in the display 110 may be offset by 45 degrees. Because the rotation tool 107 is currently at 180 degrees (approximately due west), the frame corresponding to the west-facing frame of the water tower may be displayed. Similarly, if the user returns the rotation tool 107 to the due south position of FIG. 1A, the south-facing frame of the water tower 101 may be displayed when the rotation tool crosses the 225 degree point (or west southwest).

Figure 1C:
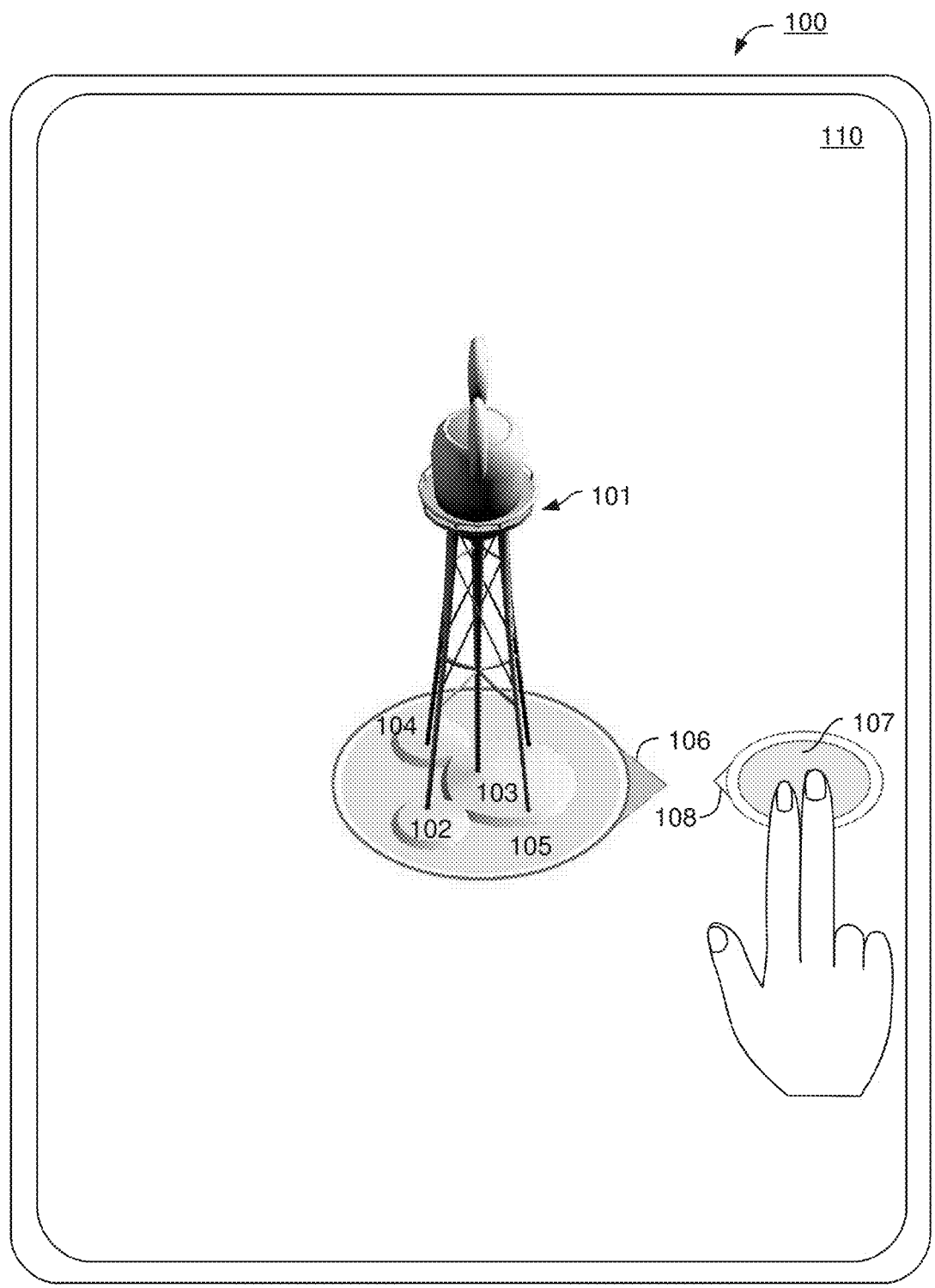

FIG. 1C illustrates the touch display 110 as the user has moved the rotation tool 107 to a new position. As shown, the user has moved the rotation tool 107 such that it is approximately due north of the water tower 101. Stated differently, the user has moved the rotation tool 107 90 degrees counter-clockwise (or 270 degrees clockwise) from the position in FIG. 1B relative to the water tower 101 (or a center point thereof). As the user moves the rotation tool 107, the water tower 101 (and circles 102-104) rotates such that the pointing indicator 106 of the rotation bubble 105 points at the pointing indicator 108 of the rotation tool 107. As such, the pointing indicator 106 of the rotation bubble 105 is pointing due north, while the pointing indicator 108 of the rotation tool 107 is pointing due south.

Figure 1D:
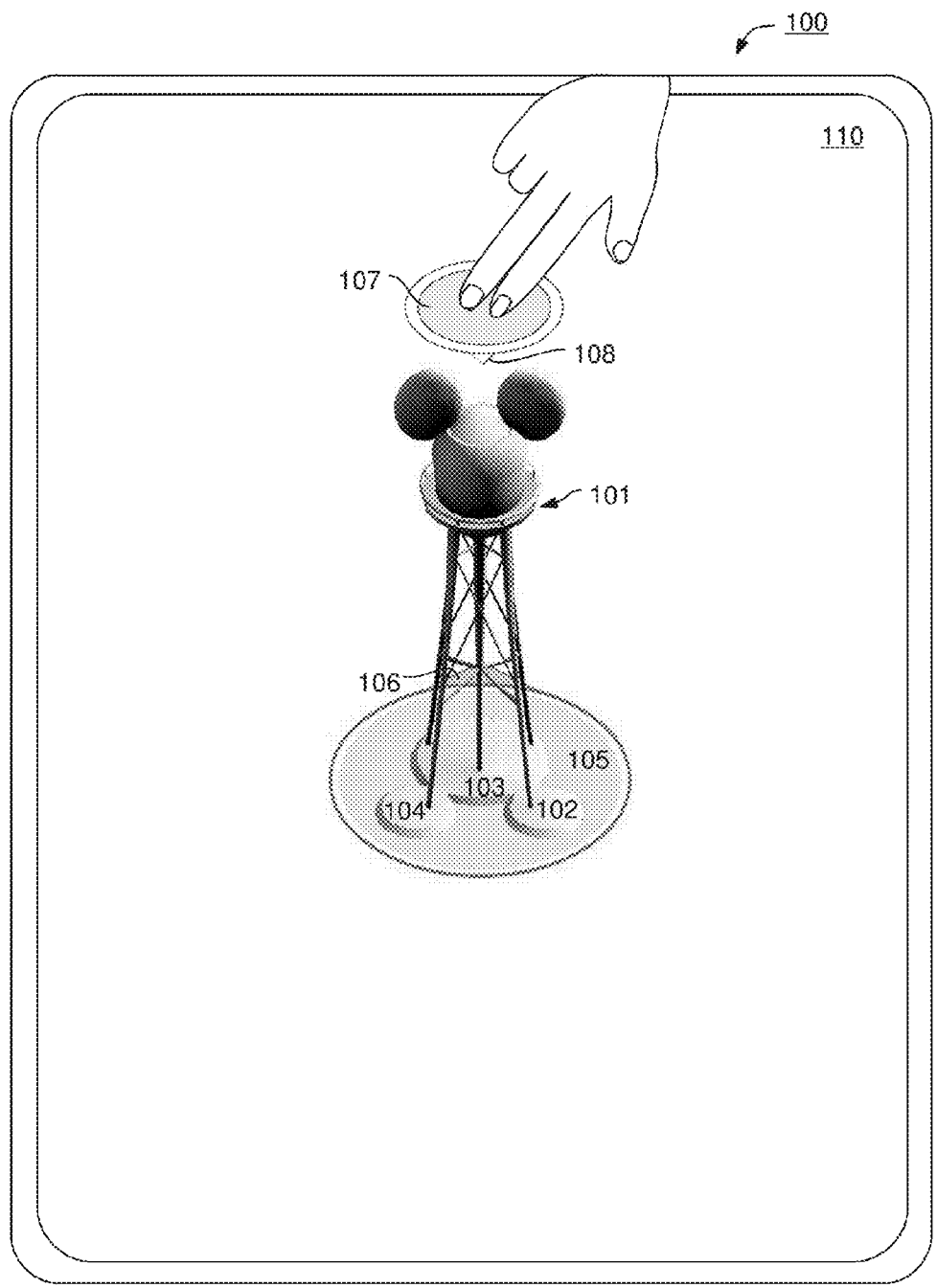

FIG. 1D illustrates the touch display 110 as the user has moved the rotation tool 107 to a new position. As shown, the user has moved the rotation tool 107 such that it is approximately due east of the water tower 101. Stated differently, the user has moved the rotation tool 107 90 degrees counter-clockwise (or 270 degrees clockwise) from the position in FIG. 1C relative to the water tower 101 (or a center point thereof). As the user moves the rotation tool 107, the water tower 101 (and circles 102-104) rotates such that the pointing indicator 106 of the rotation bubble 105 points at the pointing indicator 108 of the rotation tool 107. As such, the pointing indicator 106 of the rotation bubble 105 is pointing due east, while the pointing indicator 108 of the rotation tool 107 is pointing due west. When the user releases the rotation tool 107, the rotation tool 107 may snap back closer to the water tower 101, such that the pointing indicators 106 and 108 are touching. If the user releases the rotation tool 107 and touches an empty area of the display 110, the rotation tool 107 may disappear.

At any point in during the movement depicted in FIGS. 1A-1D, the user may manipulate the "camera" used to render the output displayed on the touch screen display 110. For example, the user may pinch on the touch screen display 110 to zoom in or out, making the water tower 101 and circles 102-104 appear larger or smaller, respectively. Furthermore, the user may pan or rotate the camera by moving an area of the display 110 that is not displaying an object. For example, if the user drags an empty space of the display 110 to the right, the water tower 101 and circles 102-104 would move towards the left edge of the display 110. If the user uses two fingers to rotate an empty area of the display 110 in a clockwise motion, everything rendered on the display 110 would rotate clockwise, according to the magnitude of the user's rotation.

FIGS. 2A-2C are schematics illustrating a touch interface for snapping rotation based on regular increments, according to one embodiment. As shown, FIG. 2A depicts a triangle 201 that has been selected by a user. As such, the rotation tool 107 is displayed, allowing the user to rotate the triangle 201. The triangle 201 is not depicted as including a pointing indicator for the sake of clarity, as the point of the triangle points at the pointing indicator 108 of the rotation tool 107. In FIGS. 2A-2C, "snapping" rotation has been implemented, such that objects rotate 45 degrees at a time, based on the location of the rotation tool 107.

As shown in FIG. 2B, the user has moved the rotation tool 107 to a new point. However, the triangle 201 has been "snapped" to a new position 45 degrees from the previous position. As shown, a guide line 202 appears which intersects the triangle 201 at a 45 degree angle. Even though the user has moved the rotation tool 107 more than 45 degrees, the triangle 201 is snapped at the 45 degree angle, aligned with the guide line 202. Generally, in snapping rotation, the rotation tool 107 continues to follow the user's finger 109 (or other touch input device), but the object's orientation stays aligned to the guide line 202 until the rotation tool 107 is outside of a predefined snap range. Therefore, if the snap range is defined to be 10 degrees, the triangle 201 remains snapped to the guide line 202 (at 45 degrees) while the rotation tool 107 is between 35 and 55 degrees. In some embodiments, the guide line 202 may appear at all times during movement of the rotation tool 107, where the guide line 202 depicts the current rotation of the increment.

As shown in FIG. 2C, the user has moved the rotation tool 107 to a point less than 90 degrees from the original orientation in FIG. 2A. However, as snap rotation is being implemented, the triangle 201 is snapped to the guide line 203, which is set at 90 degrees. Therefore, the rotation tool 107 follows the user's finger 109, while the triangle 201 snaps to the guide line 203, as the rotation tool 107 is within the snap range of the guide line 203. As shown in FIGS. 2B-2C, the pointing indicator 108 does not align precisely with the point of the triangle 201, as the snap rotation has rotated the triangle 201 less than or more than the location of the rotation tool 107.

FIGS. 2D-2E illustrate snapping rotation to match nearby or similar objects, according to one embodiment. As shown in FIG. 2D, two triangles 210-211 are displayed in different orientations. A user may touch triangle 210, which causes the rotation tool 107 to be displayed. FIG. 2E depicts a scenario where the user has moved the rotation tool 107 within a snap range (such as predefined number of degrees) of the axis of triangle 211. As such, the orientation of triangle 210 is "snapped" to match the orientation of triangle 211, even though the user has moved the rotation tool 107 to a point past the axis of the triangle 211. The rotation tool 107 therefore continues to follow the user's finger 109, but the orientation of the triangle 210 remains aligned to the guide line 212 until the rotation tool 107 is moved out of the predefined snap range. The two parallel guide lines 212 are drawn along the axes of both triangles 211-212 to communicate the results of the snapping to the user. Although the triangles 210 and 211 are identical (except for orientation), the techniques described in FIG. 2E may be applied because of the proximity of the triangles 210-211. For example, if the triangle 211 was in fact a square, the triangle 210 may still snap to match the orientation of the square if the triangle 210 is within a predefined distance of the square.

FIGS. 2F-2G illustrate techniques to use the rotation tool 107 to rotate multiple objects as a group, according to one embodiment. As shown, four different objects are displayed in FIG. 2F, namely squares 221 and 223, and triangles 222 and 224. A user may have touched each shape 221-224 in sequence, at which point a border 225 appears around the objects and the rotation tool 107 appears. The pointing indicator 108 may extend to touch the axis of the border 225. When the user moves the rotation tool 107, each of the shapes 221-224 rotate around a center point 220 of all of the shapes. Therefore, as shown in FIG. 2G, the user has moved the rotation tool 107 to a new location. In response, the shapes 221-224 have been rotated approximately 45 degrees clockwise to match the location of the rotation tool 107.

Figure 3:
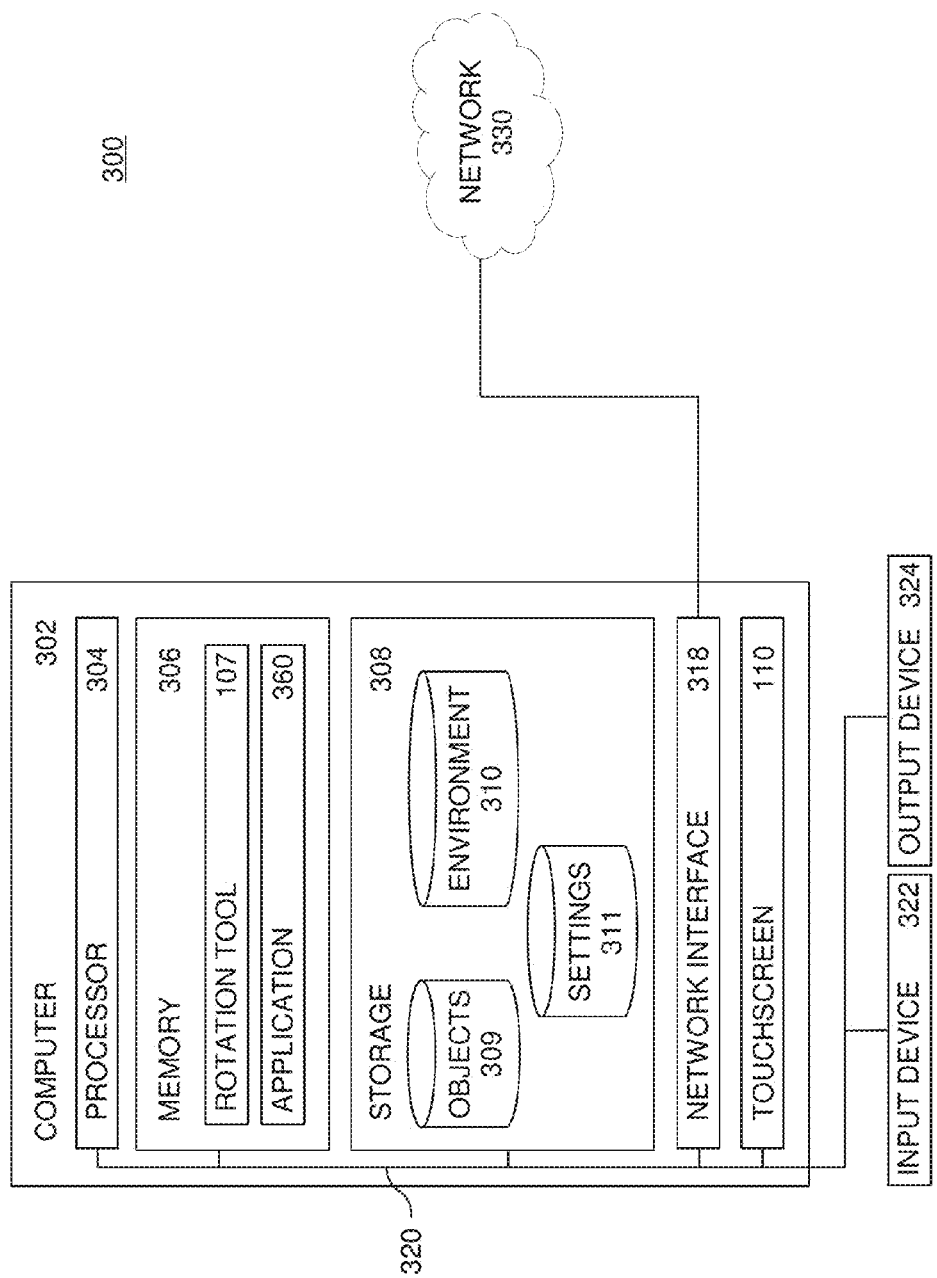
FIG. 3 is a block diagram illustrating a system to provide a touch interface for precise rotation of an object, according to one embodiment.

FIG. 3 is a block diagram illustrating a system 300 to provide a touch interface for precise rotation of an object, according to one embodiment. The networked system 300 includes a computer 302. The computer 302 may also be connected to other computers via a network 330. In general, the network 330 may be a telecommunications network and/or a wide area network (WAN). In a particular embodiment, the network 330 is the Internet.

The computer 302 generally includes a processor 304 connected via a bus 320 to a memory 306, a network interface device 318, a storage 308, an input device 322, and an output device 324. The computer 302 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is included to be representative of a single CPU, multiple CPUs, a single CPU having multiple processing cores, and the like. The network interface device 318 may be any type of network communications device allowing the computer 302 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The touch screen 110 is an electronic visual display that can detect the presence and location of a touch within the display area. The touch screen 110 can be any variety of interactive display technologies that allow users to interact with the display using an electronic pen, a stylus, a finger or other input element/device. By way of example, the underlying mechanism for interacting with the touch screen 110 can be electromagnetic, capacitive, resistive, etc. For purposes of illustration, embodiments will be described herein with respect to a touch-sensitive display whereby a user may interact with the display via capacitive coupling (in which the user forms one electrode in a circuit) or via a resistive system in which the pressure applied to the screen by the user's finger urges the screen into contact with an underlying conducting plate thereby registering the contact of the finger at a particular location on the display. But, in any case, the particular underlying interactive display technology is not limiting of the disclosure.

The input device 322 may be any device for providing input to the computer 302. For example, a keyboard and/or a mouse may be used. The output device 324 may be any device for providing output to a user of the computer 302. For example, the output device 324 may be any conventional display screen or set of speakers. Although shown separately from the input device 322, the output device 324 and input device 322 may be combined.

As shown, the memory 306 contains the rotation tool 107, which is an application generally configured to allow users to precisely rotate objects 309 via the touch screen 110. The rotation tool 107 may rotate any number of selected objects. The rotation tool 107 may provide for 360 degrees of rotation or may provide interval rotation (such as rotating every 5 degrees). Furthermore, the rotation tool 107 may provide "snap" rotation based on guide lines, adjacent objects, or identical objects. The objects 309 rotated by the rotation tool 107 may be provided in an application 360, which may be any type of application, such as a video game, virtual world, drawing application, and the like. In some embodiments, the rotation tool 107 is a component of the application 360. Generally, a user interacting with the application 360 may use the rotation tool 107 to rotate objects 309 while retaining expected camera controls. Specifically, users may continue to pinch to zoom, twist to rotate, and drag to pan (so long as the drag begins anywhere on the touch screen 110 other than the object 309 or the rotation tool 107). The user may also drag the object 309 to move the object 309 to a different location on the touch screen 110.

As shown, storage 308 contains the objects 309, the environment 310, and the settings 311. The objects 309 are a plurality of different graphical objects that may be displayed, rotated, and moved in the application 360. A single object 309 may include multiple frames, or perspectives, of the object 309. The environment 310 provides the canvas, video game, or virtual world that the user may add objects 309 to. The settings 311 include any number and type of settings for the rotation tool 107, such as threshold distances to snap adjacent objects, threshold angle (or other distance) ranges for snap rotations, interval rotation, and the like.

Figure 4:
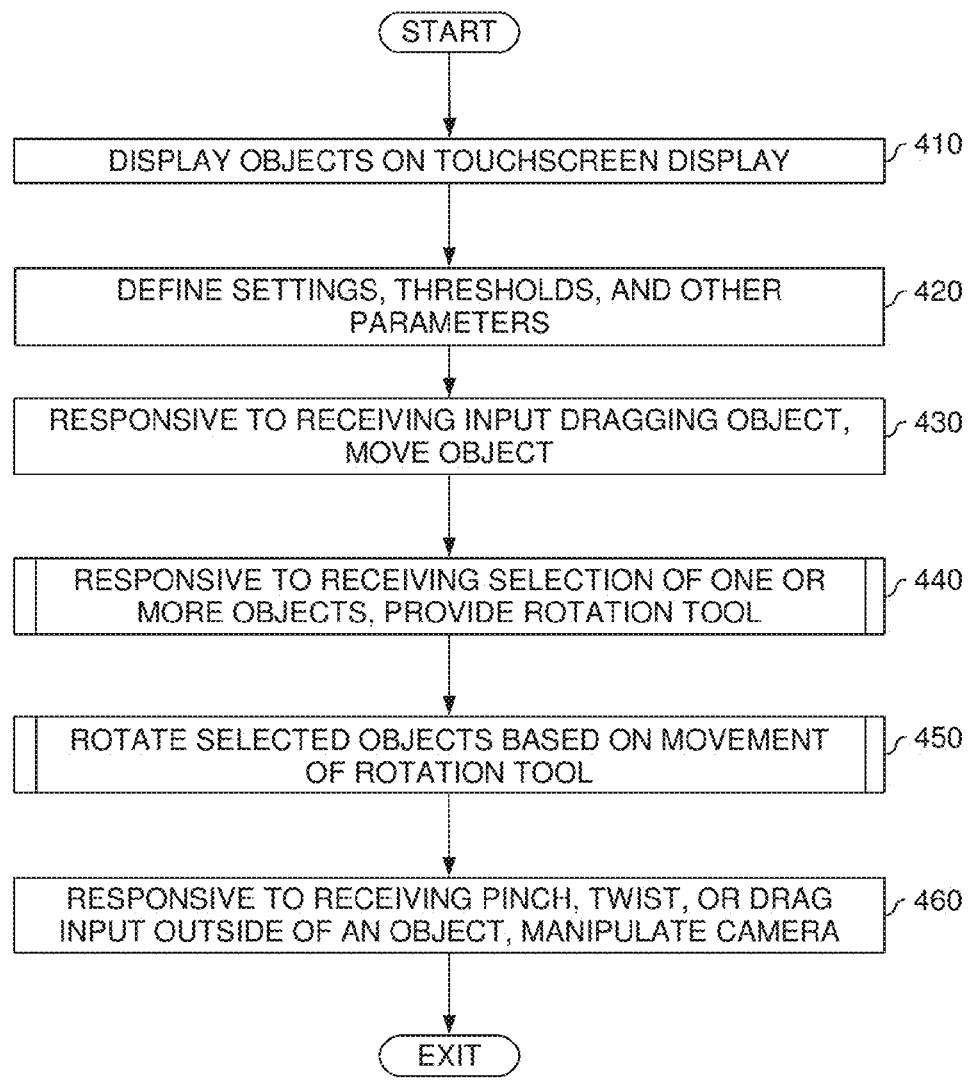
FIG. 4 is a flow chart illustrating a method to provide a touch interface for precise rotation of an object, according to one embodiment.

FIG. 4 is a flow chart illustrating a method 400 to provide a touch interface for precise rotation of an object, according to one embodiment. Generally, the steps of the method 400 provide the rotation tool 107 to allow a user to rotate objects on a touch screen display, while maintaining expected camera controls in an application, such as the application 360. The method 400 begins at step 410, where the application 360 may display one or more objects 309 on a touch screen display. At step 420, a user may define settings, thresholds, or other parameters for using the rotation tool 107. For example, the user may enable interval rotation, and specify that the objects should rotate at 10 degree intervals when the rotation tool 107 is within 3 degrees of the nearest interval. In some embodiments, the rotation tool 107 and/or the application 360 may include default parameters, settings, and thresholds in the settings 311 that the user may modify. At step 430, the application 360 may move a selected object responsive to user input dragging the object from one location to another on the touch screen display.

At step 440, described in greater detail with reference to FIG. 5, the application 360 may provide the rotation tool 107 responsive to user input selecting one or more objects via the touch screen display. The rotation tool 107 appears co-planar with the ground plane (or whatever plane is perpendicular to the axis around which the object will be rotated). Initially, the rotation tool 107 may appear at the "front" face of an object. The rotation tool 107 may also point directly at the front face of the object. At step 450, described in greater detail with reference to FIG. 6, the rotation tool 107 rotates selected objects based on the user's movement of the rotation tool 107. When the user drags the rotation tool 107, the selected object's facing (or orientation) changes in real time such that the front face of the object points directly towards the rotation tool 107. The rotation tool 107 follows the user's finger (or other input mechanism) as it moves across the touch screen surface. When the user releases the rotation tool 107, the object keeps its new facing (or orientation). At step 460, the application 360 may manipulate a "camera" responsive to receiving pinch, twist, or drag input outside of an object, even while the rotation tool 107 is active. For example, the user may pinch to zoom, twist to rotate, or drag to pan the "camera" rendering a display in the application 360.

Figure 5:
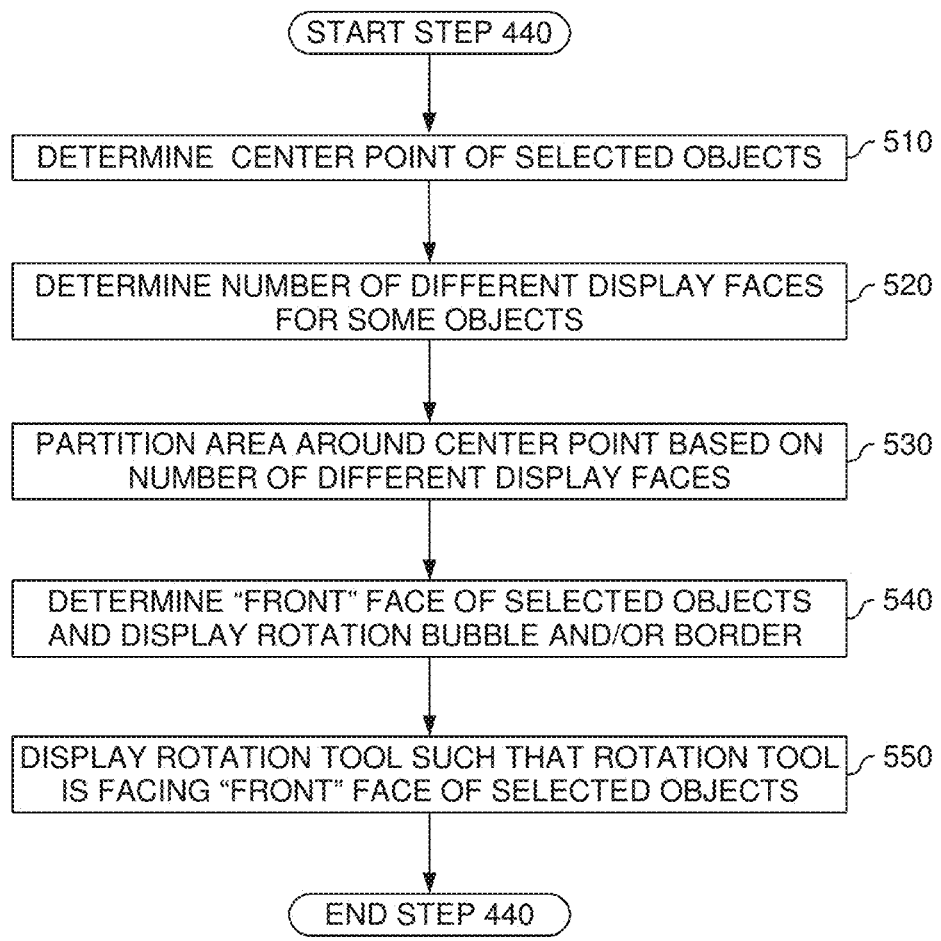
FIG. 5 is a flow chart illustrating a method to provide a rotation tool, according to one embodiment.

FIG. 5 is a flow chart illustrating a method 500 corresponding to step 440 to provide a rotation tool, according to one embodiment. At step 510, the rotation tool 107 (or the application 360) may determine a center point of the selected object(s). At step 520, the rotation tool 107 (or the application 360) may determine a number of different display faces for some objects. For example, a dog that may be placed in a video game may have 6 associated images, each depicting a different perspective of the dog. At step 530, the rotation tool 107 may partition an area around the center point determined at step 510 based on the number of different display faces determined at step 530. In partitioning the area, the rotation tool 107 may associate each partition with a respective image of the object, in a 1:1 mapping. For example, the rotation tool 107 may partition an infinite circle around the center point into 6 different regions, with each region corresponding to an image of the dog. If the rotation tool 107 is in one of the regions, the image of the dog corresponding to the region will be displayed.

At step 540, the rotation tool 107 may determine the "front" face of selected objects and display the rotation bubble underneath the selected objects. If multiple objects are selected, the rotation tool 107 may display a border around the selected objects, as depicted in FIG. 2F-2G. The rotation tool 107 may use any method to determine the "front" face of the selected objects. For example, a direction may be defined in the settings 311 that indicates the south-facing side of the object may be the "front" face of the objects. As another example, a specified angle may be used as the "front" face of the objects, such as 90 degrees, in which case the rotation tool 107 will point to the object from the north. As still another example, the "front" face of each object may be defined in the object's 3D model, such as defining the object's positive X-axis as the front. As yet another example, the rotation tool 107 may be displayed according to the player's current view of an object. For example, the rotation tool 107 may always be displayed below an object on the player's screen regardless of the object's current orientation. For group rotation, the predefined front face may be based on the internal orientation of the first or last object selected in the group. As another example, as in the single object scenario, the rotation tool 107 may be displayed according to the player's current view of the objects. Therefore, the rotation tool 107 may always be displayed below (or above, or to one side) the selected group of objects At step 550, the rotation tool 107 (or the application 360) may display the rotation tool 107 such that the rotation tool is facing the "front" face of the selected objects. Additionally, the rotation tool 107 may be displayed such that the rotation tool 107 points directly at a pointing indicator of the selected objects. Still further, the rotation tool 107 may be attached to the selected objects, the rotation bubble, or the border of multiple objects.

Figure 6:
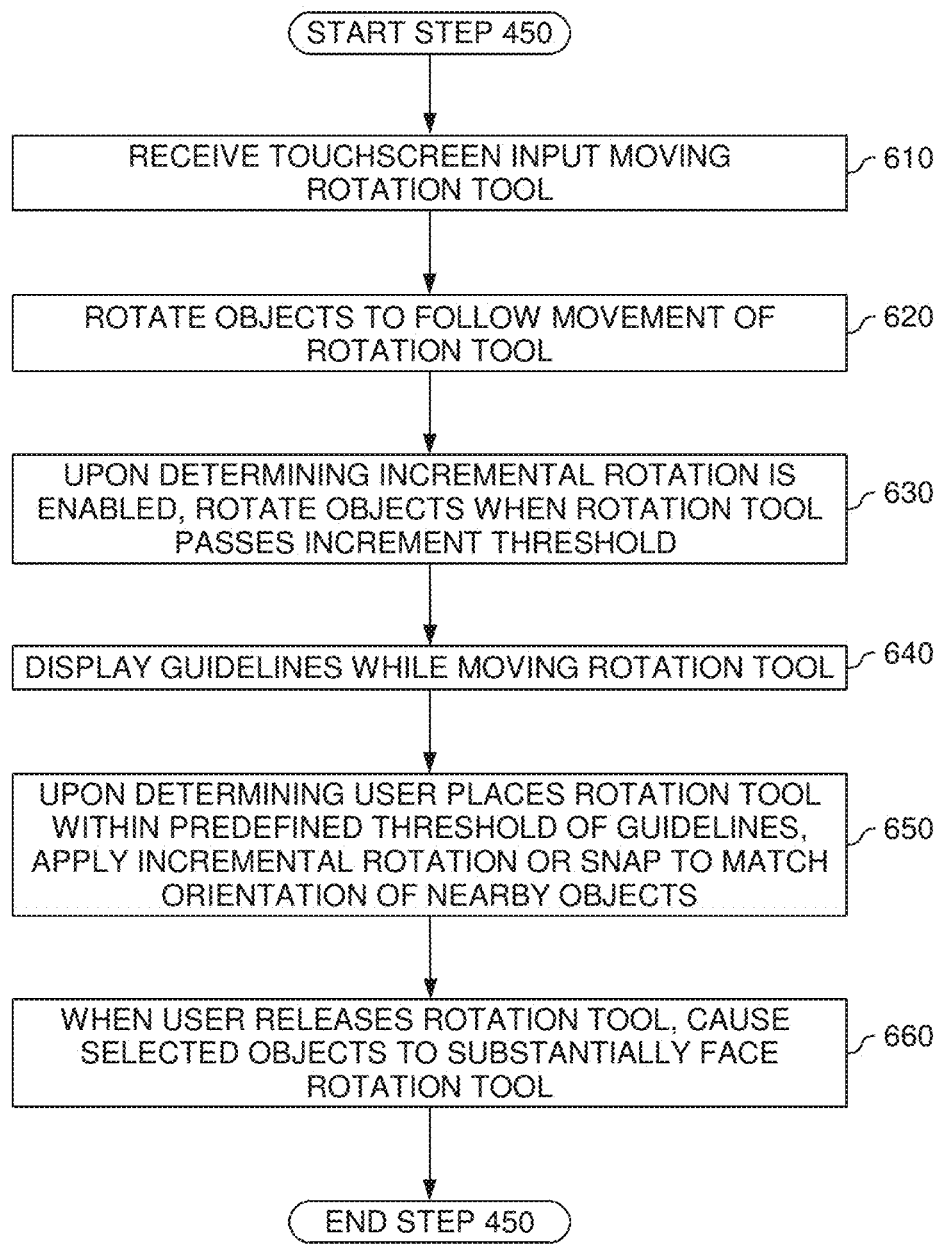
FIG. 6 is a flow chart illustrating a method to rotate objects based on movement of a rotation tool, according to one embodiment.

FIG. 6 is a flow chart illustrating a method 600 corresponding to step 450 to rotate objects based on movement of a rotation tool, according to one embodiment. At step 610, the rotation tool 107 may receive touch screen input moving the rotation tool. For example, the user may move the rotation tool 107 from a point at 45 degrees relative to the center of the object to a point at 90 degrees relative to the center of the object. At step 620, the rotation tool 107 may rotate the objects to follow the movement of the rotation tool 107 in real time. At step 630, the rotation tool 107 may, upon determining incremental rotation is enabled, rotate objects when the rotation tool 107 passes a specified increment threshold (such as 30, 45, or 60 degrees). At step 640, the rotation tool 107 may display guidelines while the user is moving the rotation tool 107. The guidelines may be displayed for general rotation, incremental rotation, or snapping to nearby or identical objects. At step 650, the rotation tool 107 may apply incremental rotation or snapping upon determining that the user places the rotation tool 107 within a predefined threshold distance of the guidelines. For example, if the guidelines are parallel guidelines for identical objects, the rotation tool 107 may snap the selected object to match the rotation of the identical object when the rotation tool 107 is within a predefined angular distance of the axis of the guideline. Similarly, if a guideline is drawn to assist the user in incremental rotation, the rotation tool 107 may snap the object when the user is within a threshold distance of the guideline. In each case, the rotation tool 107 continues to follow the user's finger, while the object snaps to the guideline. At step 660, the rotation tool 107 may cause the selected objects to substantially face the rotation tool (or face in the direction of the snapped guideline) when the user releases the rotation tool.

Advantageously, embodiments disclosed herein allow users to manipulate objects on a touch screen display using a touchable rotation tool. The rotation tool may be used to rotate objects while traditional camera controls remain active. The rotation tool may be displayed responsive to user input selecting an object. When the player drags the rotation tool, the selected object's facing changes in real time such that the "front" face of the object points directly towards the rotation tool. The rotation tool follows the user's finger (or pen, stylus, etc) as it is moved across the touch screen surface. When the player releases the rotation tool, the object keeps its new facing/orientation.

In the foregoing, reference is made to embodiments of the disclosure. However, it should be understood that the disclosure is not limited to specific described embodiments. Instead, any combination of the features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the rotation tool 107 could execute on a computing system in the cloud and allow users to rotate objects in video games or other virtual environments. In such a case, the rotation tool 107 could receive user input rotating objects and store the rotated objects at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method to rotate virtual objects within a virtual environment being displayed on a touch screen display, comprising:
    upon receiving a selection of a first virtual object using the touch screen display, rendering one or more frames depicting a rotation tool in a predefined location relative to the first virtual object and having a first orientation to the first virtual object;
    responsive to receiving input from the touch screen display, moving the rotation tool from a first location to a second location on the touch screen display as specified by the received input;
    responsive to the movement of the rotation tool, rotating the first virtual object within the virtual environment based on the movement of the rotation tool, wherein the first virtual object substantially maintains the first orientation to the rotation tool throughout the movement; and
    upon determining that rotating the first virtual object to face the rotation tool at the second location causes the first virtual object to be within a threshold orientation of a second virtual object, rotating the first virtual object to match an orientation of the second virtual object.

2. The method of claim 1, wherein the first virtual object is rotated according to an angle of rotation, relative to the first virtual object, between the first location and the second location, the method further comprising:
    displaying a rotation bubble below the first virtual object, wherein the rotation bubble substantially maintains the first orientation to the rotation tool.

3. The method of claim 1, wherein rotating the first virtual object further comprises:
    rotating the first virtual object at a first interval, of a plurality of intervals, upon determining that the input has moved the rotation tool past a first threshold interval, of a plurality of threshold intervals.

4. The method of claim 1, wherein rotating the first virtual object further comprises:
    defining a set of zones surrounding the first virtual object, each zone in the set of zones corresponding to a respective frame, of a set of frames of the first virtual object, wherein each frame corresponds to a different viewing perspective of the first virtual object;
    identifying a first zone, of the set of zones, corresponding to the second location; and
    displaying a first frame of the first virtual object, wherein the first frame corresponds to the first zone.

5. The method of claim 1, wherein the rotation tool is co-planar with a plane perpendicular to an axis around which the first virtual object is rotated.

6. The method of claim 1, further comprising:
    prior to receiving the touch screen input, receiving input selecting the first virtual object and a second virtual object, wherein the touch screen input rotates the first and second virtual objects such that a center point between the first and second objects substantially maintains the first orientation to the rotation tool throughout the movement.

7. A computer program product, comprising:
    a non-transitory computer-readable storage medium storing instructions which when executed by a processor, performs an operation to rotate virtual objects within a virtual environment being displayed on a touch screen display, the operation comprising:
        upon receiving a selection of a first virtual object and a second virtual object using the touch screen display, rendering one or more frames depicting a rotation tool in a predefined location and having a first orientation to a center point between the first and second virtual objects;
        responsive to receiving input from the touch screen display, moving the rotation tool from a first location to a second location on the touch screen display as specified by the received input; and
        responsive to the movement of the rotation tool, rotating the first and second virtual objects within the virtual environment based on the movement of the rotation tool, wherein the center point between the first and second virtual objects substantially maintains the first orientation to the rotation tool throughout the movement.

8. The computer program product of claim 7, wherein the first and second virtual objects are rotated according to an angle of rotation, relative to the center point between the first and second virtual objects, between the first location and the second location, the operation further comprising:
    displaying a rotation bubble below the first and second virtual objects, wherein the rotation bubble substantially maintains the first orientation to the rotation tool.

9. The computer program product of claim 7, wherein rotating the first and second virtual objects further comprises:
    rotating the first and second virtual objects at a first interval, of a plurality of intervals, upon determining that the input has moved the rotation tool past a first threshold interval, of a plurality of threshold intervals.

10. The computer program product of claim 7, wherein rotating the first and second virtual objects further comprises:
    defining a set of zones surrounding the first and second virtual objects, each zone in the sets of zones corresponding to a respective frame, of a respective set of frames of the first and second virtual objects, wherein each frame corresponds to a different viewing perspective of the respective first and second virtual objects;
    identifying a first zone and a second zone, of the sets of zones for the first and second virtual objects, respectively, corresponding to the second location; and
    displaying a first frame of the first virtual object and a second frame of the second virtual object, wherein the first frame corresponds to the first zone and the second frame corresponds to the second zone.

11. The computer program product of claim 7, wherein the rotation tool is co-planar with a plane perpendicular to an axis around which the first and second virtual objects are rotated.

12. The computer program product of claim 7, the operation further comprising:

upon determining that rotating the first virtual object to face the rotation tool at the second location causes the first and second virtual objects to be within a threshold orientation of a third virtual object, rotating the first and second virtual objects to substantially maintain an orientation of the third virtual object.

13. A system, comprising:
a computer processor; and
a memory containing a program which when executed by the processor, performs an operation to rotate virtual objects within a virtual environment being displayed on a touch screen display, the operation comprising:
   upon receiving a selection of a first virtual object using the touch screen display, rendering one or more frames depicting a rotation tool in a predefined location relative to the first virtual object and having a first orientation to the first virtual object;
   responsive to receiving input from the touch screen display, moving the rotation tool from a first location to a second location on the touch screen display as specified by the received input;
   responsive to the movement of the rotation tool, rotating the first virtual object within the virtual environment based on the movement of the rotation tool, wherein the first virtual object substantially maintains the first orientation to the rotation tool throughout the movement; and
   upon determining that rotating the first virtual object to face the rotation tool at the second location causes the first virtual object to be within a threshold orientation of a second virtual object, rotating the first virtual object to match an orientation of the second virtual object.

14. The system of claim 13, wherein the first virtual object is rotated according to an angle of rotation, relative to the first virtual object, between the first location and the second location, the operation further comprising:
   displaying a rotation bubble below the first virtual object, wherein the rotation bubble substantially maintains the first orientation to the rotation tool.

15. The system of claim 13, wherein rotating the first virtual object further comprises:
   rotating the first virtual object at a first interval, of a plurality of intervals, upon determining that the input has moved the rotation tool past a first threshold interval, of a plurality of threshold intervals.

16. The system of claim 13, wherein rotating the first virtual object further comprises:
   defining a set of zones surrounding the first virtual object, each zone in the set of zones corresponding to a respective frame, of a set of frames of the first virtual object, wherein each frame corresponds to a different viewing perspective of the first virtual object;
   identifying a first zone, of the set of zones, corresponding to the second location; and
   displaying a first frame of the first virtual object, wherein the first frame corresponds to the first zone.

17. The system of claim 13, wherein the rotation tool is co-planar with a plane perpendicular to an axis around which the first virtual object is rotated.

18. The system of claim 13, the operation further comprising:
   prior to receiving the touch screen input, receiving input selecting the first virtual object and a second virtual object, wherein the touch screen input rotates the first and second virtual objects such that a center point between the first and second objects substantially maintains the first orientation to the rotation tool throughout the movement.

* * * * *